United States Patent
Zhao et al.

(10) Patent No.: US 12,526,410 B2
(45) Date of Patent: Jan. 13, 2026

(54) SYSTEMS AND METHODS FOR RECURSIVE INTER REGION PARTITIONING

(71) Applicant: Tencent America LLC, Palo Alto, CA (US)

(72) Inventors: Liang Zhao, Palo Alto, CA (US); Xin Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/780,235

(22) Filed: Jul. 22, 2024

(65) Prior Publication Data

US 2025/0301134 A1 Sep. 25, 2025

Related U.S. Application Data

(60) Provisional application No. 63/568,376, filed on Mar. 21, 2024.

(51) Int. Cl.
*H04N 19/119* (2014.01)
*H04N 19/159* (2014.01)
*H04N 19/176* (2014.01)
*H04N 19/192* (2014.01)

(52) U.S. Cl.
CPC ........ *H04N 19/119* (2014.11); *H04N 19/159* (2014.11); *H04N 19/176* (2014.11); *H04N 19/192* (2014.11)

(58) Field of Classification Search
CPC . H04N 19/159; H04N 19/176; H04N 19/1192
See application file for complete search history.

(56) References Cited

U.S. PATENT DOCUMENTS

| | | | |
|---|---|---|---|
| 11,109,026 B2* | 8/2021 | Zhao | H04N 19/159 |
| 12,278,998 B2* | 4/2025 | Fan | H04N 19/96 |
| 2014/0105291 A1 | 4/2014 | Nakamura et al. | |
| 2019/0246143 A1 | 8/2019 | Zhang et al. | |
| 2019/0281292 A1 | 9/2019 | Chuang et al. | |
| 2020/0404304 A1 | 12/2020 | Teng et al. | |
| 2021/0049100 A1* | 2/2021 | Roberts | G06F 3/0679 |
| 2021/0314630 A1 | 10/2021 | Misra et al. | |
| 2022/0337854 A1* | 10/2022 | Peringassery Krishnan | H04N 19/18 |

OTHER PUBLICATIONS

Tencent America LLC, ISRWO, PCT/US2024/040233, Oct. 16, 2024, 23 pgs.

* cited by examiner

*Primary Examiner* — Tsion B Owens
(74) *Attorney, Agent, or Firm* — Morgan, Lewis & Bockius LLP

(57) ABSTRACT

An example method includes receiving a video bitstream comprising a plurality of coding blocks. The method includes identifying, based on a first indicator in the video bitstream, a coding region that comprises two or more luma blocks and two or more chroma blocks. A subset of luma blocks in the coding region is encoded in a first prediction mode. Each chroma block in the coding region is encoded in a second prediction mode. The method includes applying a first partitioning to the two or more luma blocks in the coding region. The method includes applying a second partitioning for the two or more chroma blocks in the coding region. The method includes reconstructing the coding region using the first partitioning and the second partitioning.

20 Claims, 7 Drawing Sheets

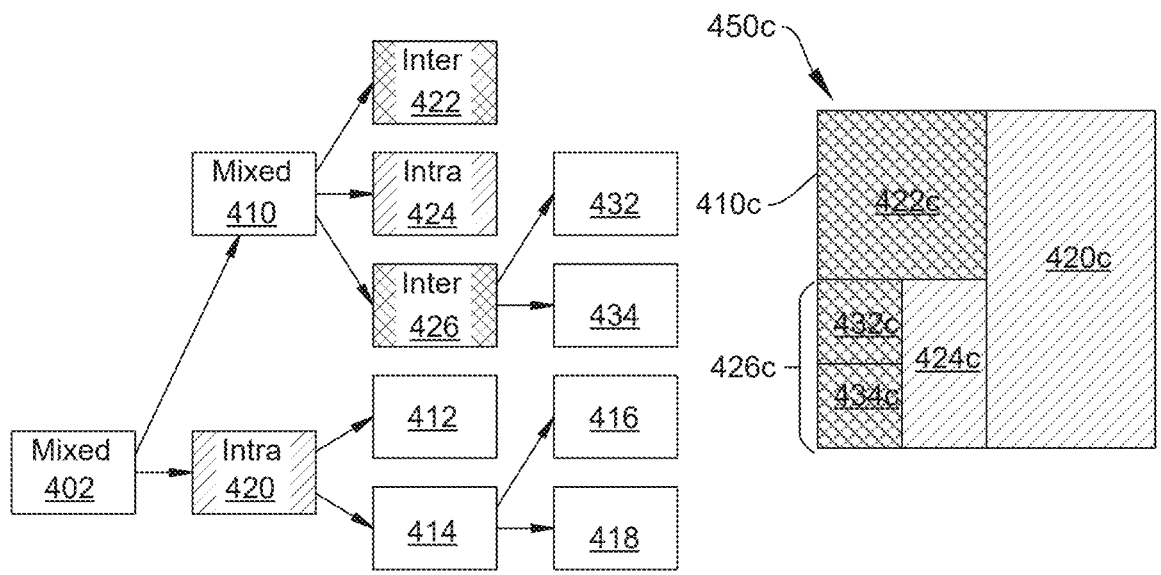
FIG. 4A
FIG. 4C
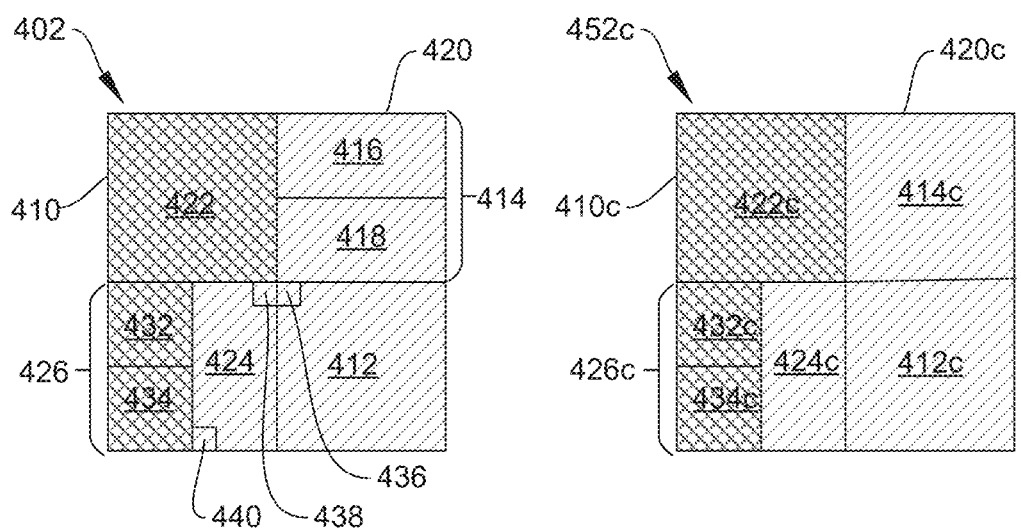
FIG. 4B
FIG. 4D

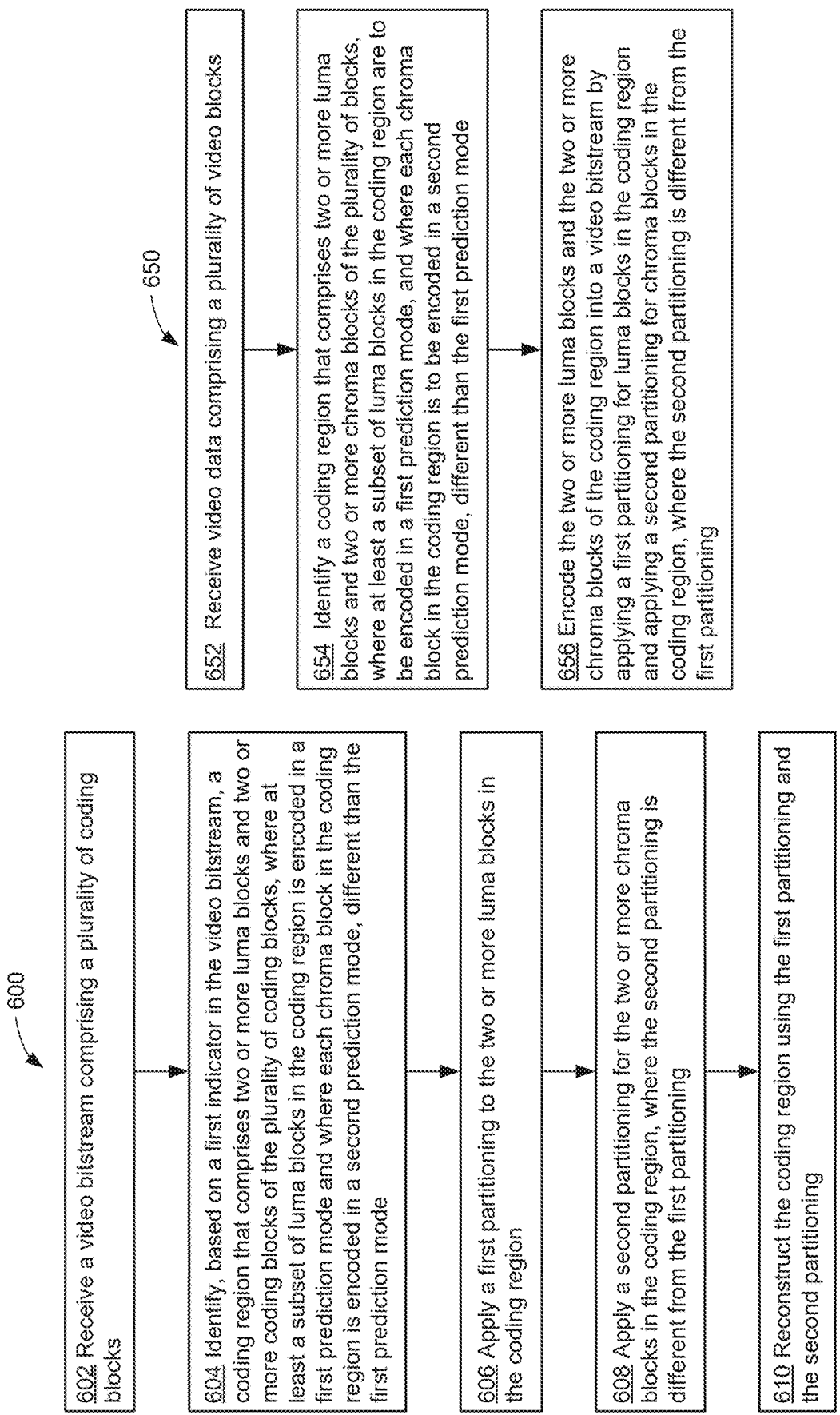

SYSTEMS AND METHODS FOR RECURSIVE INTER REGION PARTITIONING

RELATED APPLICATIONS

This application claims priority to U.S. Provisional Patent Application No. 63/568,376, entitled "Recursive Inter Region," filed Mar. 21, 2024, which is hereby incorporated by reference in its entirety.

TECHNICAL FIELD

The disclosed embodiments relate generally to video coding, including but not limited to systems and methods for coding chroma blocks and luma blocks using different partitioning.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to block partitioning, inter prediction, intra prediction, and partitioning of chroma blocks and luma blocks. Some embodiments include using different partitioning for chroma blocks and luma blocks within a coding region, where the chroma blocks and the luma blocks are coded using different prediction modes. For example, the luma blocks may be coded using inter prediction mode and the chroma blocks may be coded using a chroma from luma (CfL) prediction mode. Some embodiments include using different partitioning for chroma blocks and luma blocks within a coding region when a size of a coding region meets a size threshold. Some advantages of applying cross-component prediction mode includes removing spatial redundancy and improve coding efficiency (e.g., by capturing the correlation between the chroma and luma blocks). An advantage of using different partitioning for the chroma blocks is to reduce overhead by restricting further partitioning of the chroma blocks, as chroma blocks generally have less texture than luma blocks.

In accordance with some embodiments, a method of video decoding is provided. The method includes (i) receiving a video bitstream (e.g., a coded video sequence) comprising a plurality of coding blocks; (ii) identifying, based on a first indicator (e.g., a flag or syntax element) in the video bitstream, a coding region that comprises two or more luma coding blocks and two or more chroma coding blocks of the plurality of coding blocks, where at least a subset of luma coding blocks in the coding region is encoded in a first prediction mode and where each chroma coding block in the coding region is encoded in a second prediction mode, different than the first prediction mode; (iii) applying a first partitioning to the two or more luma blocks in the coding region; (iv) applying a second partitioning for the two or more chroma blocks in the coding region, where the second partitioning is different from the first partitioning; and (v) reconstructing the two or more coding blocks of the coding region using the first partitioning and the second partitioning.

In accordance with some embodiments, a method of video encoding is provided. The method includes (i) receiving video data (e.g., a coded video sequence or source video sequence) comprising a plurality of blocks; identifying a coding region that comprises two or more luma blocks and two or more chroma blocks of the plurality of blocks, where at least a subset of luma blocks in the coding region are to be encoded in a first prediction mode, and where each chroma block in the coding region is to be encoded in a second prediction mode, different than the first prediction mode; and (iii) encoding the two or more luma blocks and the two or more chroma blocks of the coding region into a video bitstream by applying a first partitioning for luma blocks in the coding region and applying a second partitioning for chroma blocks in the coding region, where the second partitioning is different from the first partitioning.

In accordance with some embodiments, a method of processing visual media data includes: (i) obtaining a source video sequence that comprises a plurality of frames; and (ii) performing a conversion between the source video sequence and a video bitstream of visual media data according to a format rule, where the video bitstream comprises: (a) a plurality of encoded blocks corresponding to the plurality of frames, and (b) an indicator indicating a coding region of a frame of the plurality of frames, where the coding region comprises two or more luma coding blocks and two or more chroma coding blocks of the plurality of coding blocks, where at least a subset of luma coding blocks in the coding region is encoded in a first prediction mode and where each chroma coding block in the coding region is encoded in a second prediction mode, different than the first prediction mode. The format rule specifies that: (c) the two or more luma blocks are partitioned according to a first partitioning, and (d) the two or more chroma blocks are partitioned according to a second partitioning that is different from the first partitioning.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIGS. 4A, 4B, 4C, and 4D illustrate examples of partitioning of coding blocks into regions in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes video/image compression techniques including using different partitioning for chroma blocks and luma blocks in a coding region when the coding blocks in the coding region are coded with a first predefined prediction mode, and/or when the coding region meets a size threshold. The first predefined prediction mode can be an intra coding mode, an inter coding mode, and/or a mixture of intra and inter coding modes. When splitting (e.g., recursively, or using a pre-defined splitting pattern) a block into one or multiple of equal size or smaller size sub-blocks, a flag may be signaled to indicate whether the chroma blocks can be further split or not. An advantage of using different partitioning for the chroma blocks is to reduce overhead (e.g., less coding operations and bandwidth are required) by restricting further partitioning of the chroma blocks, as chroma blocks generally have less texture than luma blocks. Another advantage of using different partitioning is improving accuracy by partitioning both the chroma and luma blocks in a more appropriate manner.

Example Systems and Devices

Figure 1:
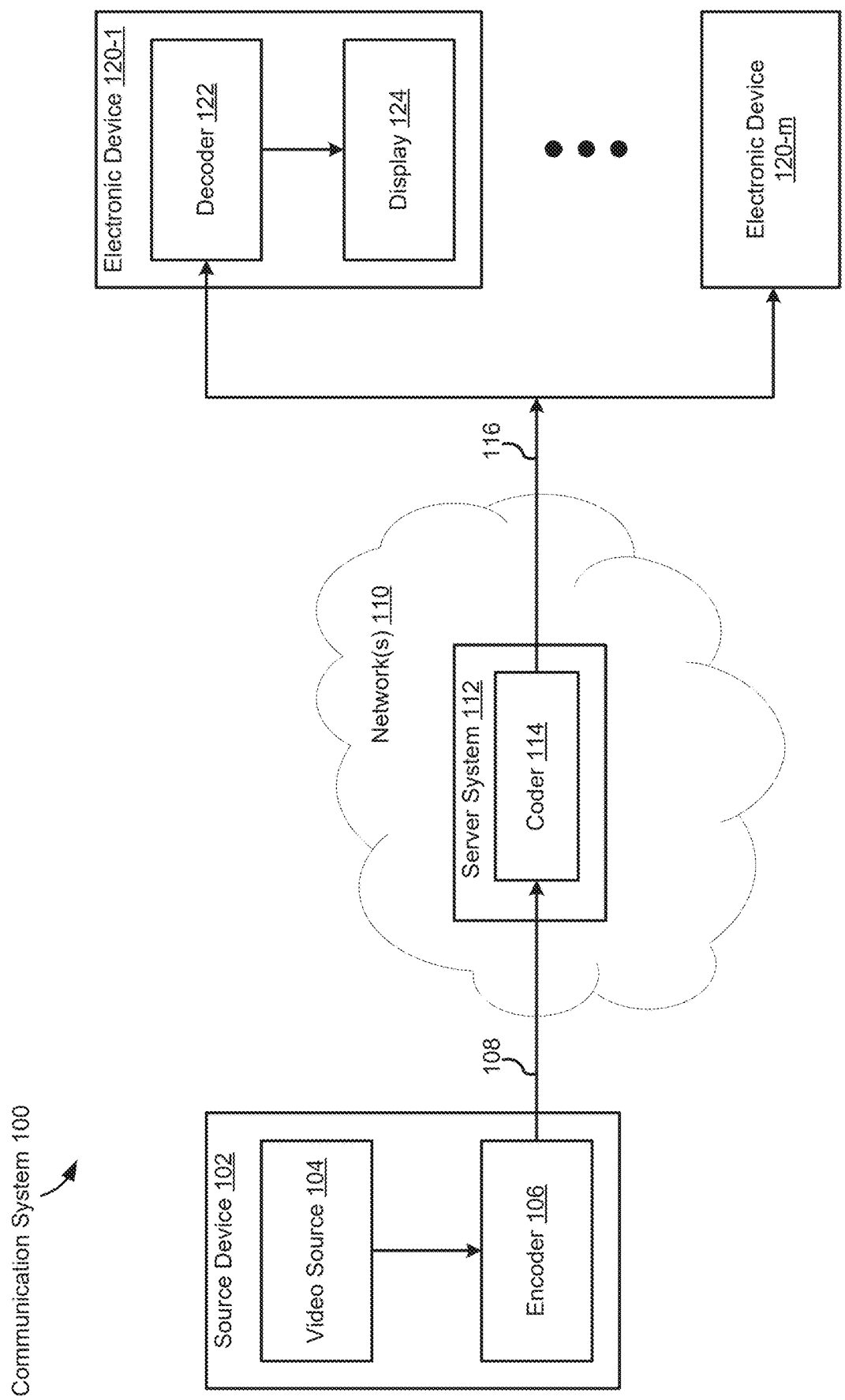
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
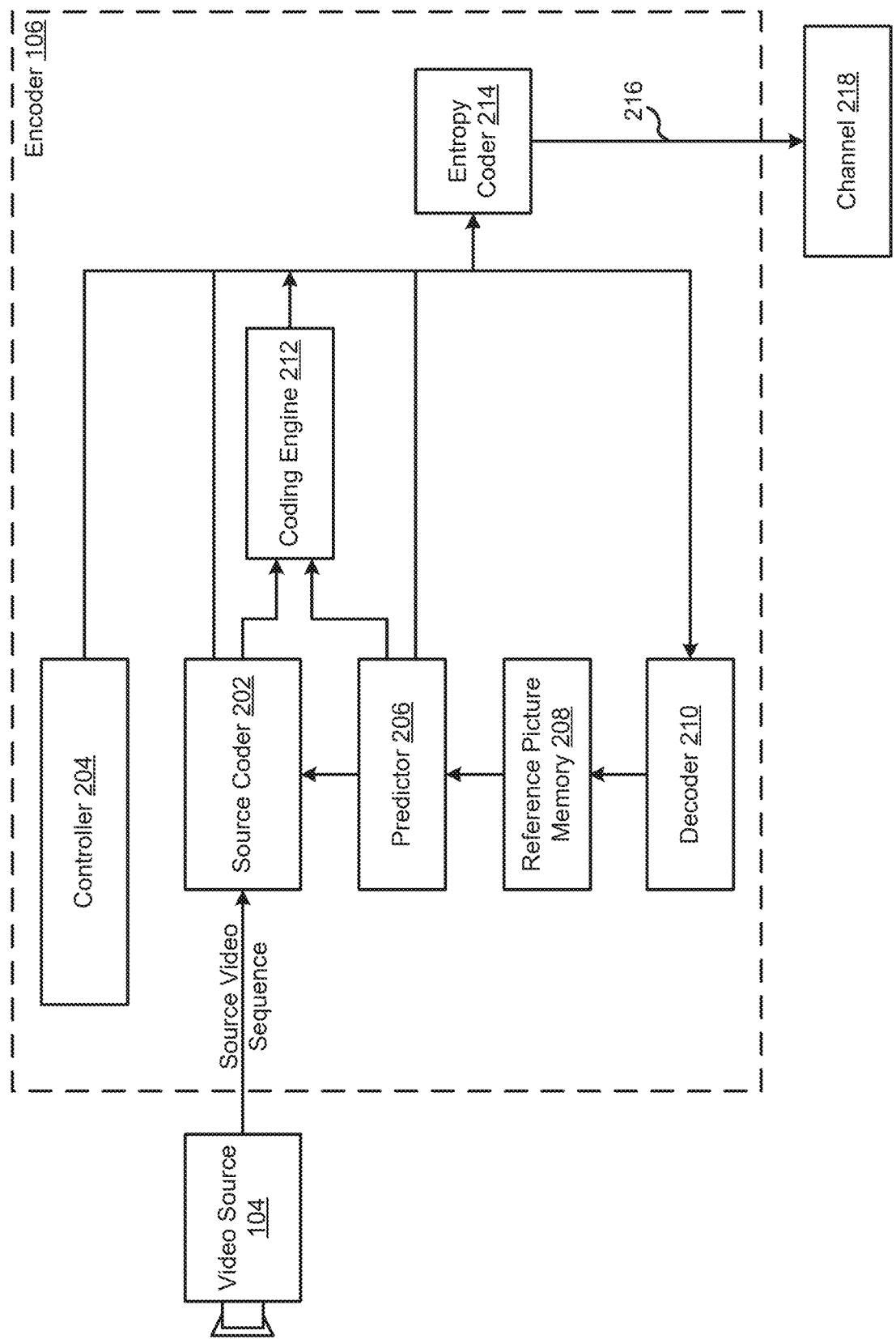
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
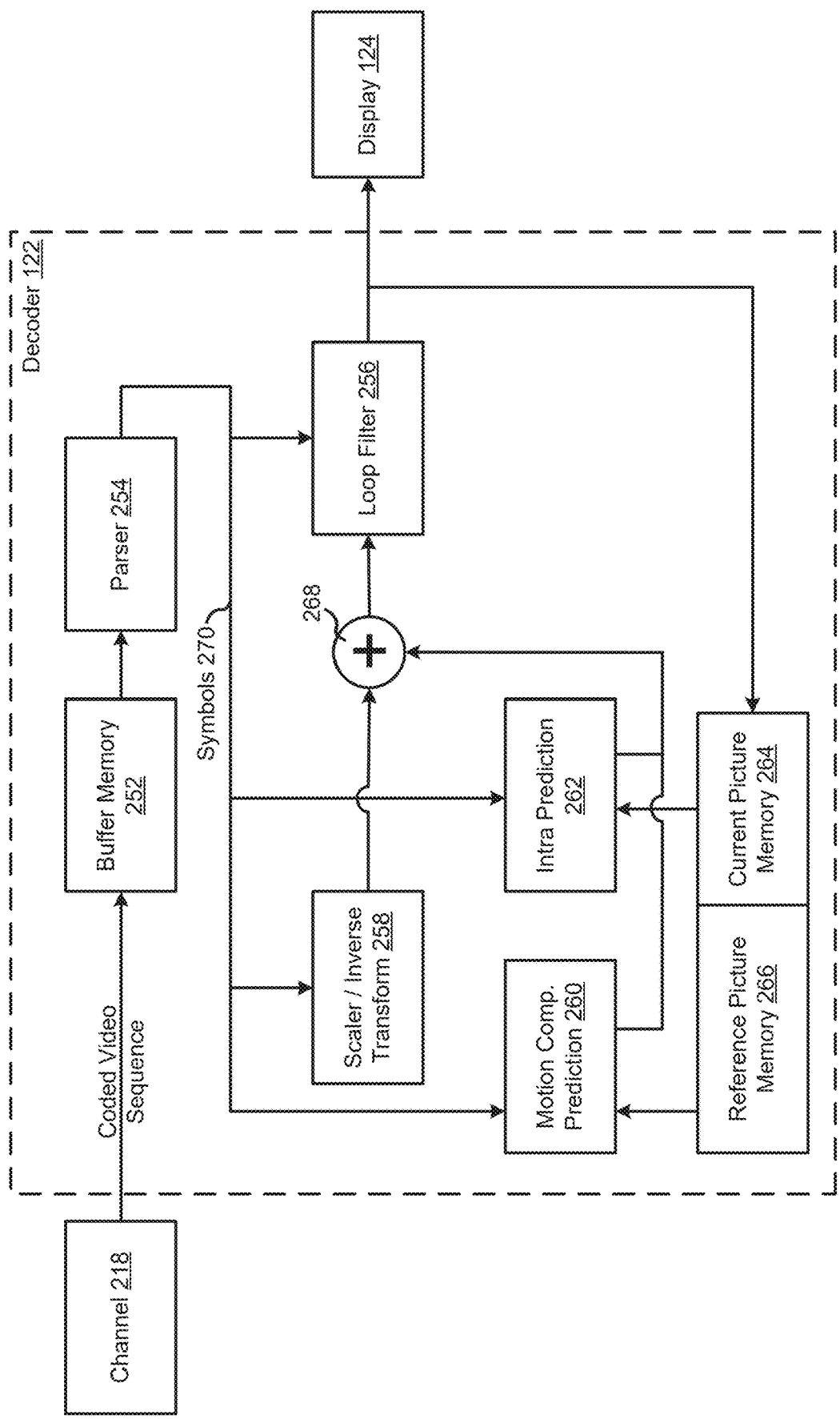
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
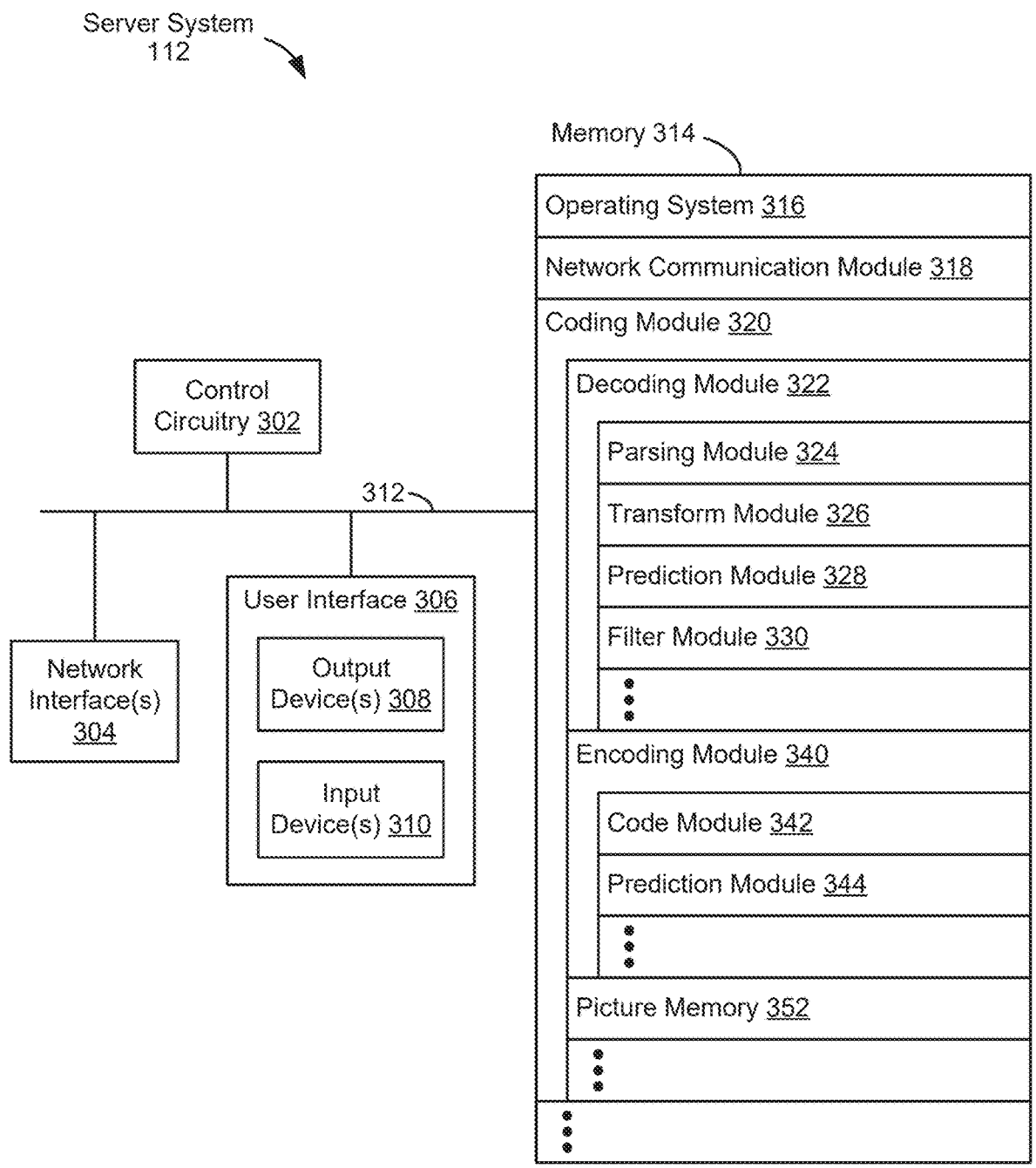
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). As used herein, a block (or sub-block) refers to a coding block (such as a super block, largest coding unit, or coding tree block), a prediction block, a transform block, or a filtering unit. As an example, a sub-block of a block A refers to a block whose area is fully contained in the block A. A block region refers to a block area that contains one or more blocks (e.g., having a same prediction mode).

An intra-inter coding mode refers to a coding mode that generates a prediction block using both intra prediction and inter prediction methods. For example, a prediction mode that derives the prediction block as a weighted sum of an intra prediction block and an inter prediction block.

A cross-component intra prediction mode refers to an intra prediction mode that uses the reconstruction samples of a first color component to predict a second color component. Examples of cross-component intra prediction modes include Chroma-from-Luma (CfL) mode, Cross-Component Linear Model (CCLM), Convolutional Cross-Component Model (CCCM), and Multi-Hypothesis Cross-Component Prediction (MH-CCP).

Turning to block partitioning for coding and decoding, general partitioning may start from a base block (e.g., a super block or root node) and may follow a predefined ruleset, partition structure, and/or scheme. The partitioning may be hierarchical and recursive. After dividing or partitioning a base block using any of the example partitioning procedures or other procedures described below, or the combination thereof, a final set of partitions or coding blocks (e.g., leaf blocks) may be obtained. Each of these partitions may be at one of various partitioning levels in the partitioning hierarchy, and may be of various shapes. Each of the partitions may be referred to as a coding block (CB), such partitions are referred to as coding blocks because they may form units for which some basic coding/decoding decisions may be made and coding/decoding parameters may be optimized, determined, and signaled in an encoded video bitstream. The highest (or deepest) level in the final partitions represents the depth of the coding block partitioning structure of a tree.

A coding block may be a luma coding block or a chroma coding block. The hierarchical structure of for all color channels may be collectively referred to as coding tree unit (CTU). The partitioning patterns or structures for the various color channels in a CTU may or may not be the same. In some embodiments, partition tree schemes or structures used for the luma and chroma channels may not be the same (luma and chroma channels may have separate coding tree structures). When separate coding partition tree structures or modes are applied, a luma channel may be partitioned into luma CBs by one coding partition tree structure, and a chroma channel may be partitioned into chroma CBs by another coding partition tree structure. In some embodiments of a partitioning structure, the CTU size may be set as 128×128 luma samples with two corresponding 64×64 blocks of chroma samples (when an example chroma sub-sampling is considered and used).

A region, or coding region, can refer to any level in any one of the partitioning schemes described above or in any other partitioning schemes not specifically described above. A region may be a frame, a slice, a super block, a macro-block, a sub-block, or a prediction block. For example, a region may be any partitioning level of a recursive partitioning scheme. A region may be at a leaf level or non-leaf level of a particular partitioning scheme. A leaf level region is a region that is not further partitioned. A non-leaf level region, on the other hand, is further partitioned into at least two child regions, each of which may be at a leaf level or may be at a non-leaf level and thus may be further partitioned. A leaf level region is predicted in whole using a particular prediction mode. For example, a leaf-level region may be either inter coded or intra coded. Optionally, a leaf level region may additionally be intra-inter coded if intra-inter prediction mode is permitted. As mentioned above, an intra-inter coding/prediction mode refers to a coding mode that generates a prediction block using both intra and inter prediction methods.

FIG. 4A illustrates an example of applying a first partitioning to luma blocks in a coding region and applying a second partitioning to chroma blocks based on a prediction mode (e.g., an intra prediction mode, an inter prediction mode, or a mixture of the intra prediction mode and the inter prediction mode) used to encode the coding region. FIG. 4A shows, as an example partitioning scheme, a top region 402 (e.g., a super block) that is partitioned into regions or blocks at four levels or depths labeled as level 1 through level 4. Leaf level regions (sometimes also called leaf partitioning tree nodes) include regions 412, 416, 418, 422, 424, 432, and 434. The top region 402 may include a signaled syntax element indicating that a mixture of the intra prediction mode and the inter prediction mode is used to encode coding blocks in the top region 402. The presence of prediction mode flag for top region 402 indicates that one or more first coding blocks (e.g., a first region) in top region 402 are intra-coded, and one or more second coding blocks (e.g., a second region) in top region 402 are inter-coded. Top region 402 is partitioned into two regions, region 410, and region 420, which are both partitions at level 2, and at a depth of one from the top region 402.

In some embodiments, the signaled syntax element is a region type flag, such as intra_region_flag, inter_region_flag, mixed_region_flag, intra-inter_region_flag, or other region type flags, that indicates a type of prediction mode used to encode all coding blocks within a coding region. For example, intra_region_flag indicates that a corresponding region in, e.g., a frame of inter-prediction type (signaled by higher level syntax, such as a frame-level syntax) includes coding blocks that are all intra-coded (e.g., coded using an intra prediction mode). Similarly, inter_region_flag indicates that a corresponding region includes coding blocks that are all inter-coded (e.g., coded using an inter prediction mode). In contrast, mixed_region_flag indicates that a corresponding region includes some coding blocks that are intra-coded, and some coding blocks that are all inter-coded, while intra-inter_region_flag indicates that a corresponding region includes coding blocks that are all coded as weighted sums of one or more inter-prediction blocks and one or more intra-prediction blocks. In some embodiments, the signaled syntax element corresponds to a particular color component (e.g., chroma or luma). For example, each color component may have its own signaled syntax element. In some embodiments, a luma component has a first region type flag and a chroma component has a second region type flag, different from the first region type flag.

Regions in FIG. 4A that include a label of "mixed," "intra," or "inter" represent regions having a corresponding region type flag. Conversely, the absence of labels in blocks illustrated in FIG. 4A indicates that region type flags are optionally not present, or that the decoder does not need to detect the presence (e.g., skip the parsing) of region type flags for the corresponding child regions or blocks. In FIG. 4A, the top region 402 includes a mixed_region_flag. The presence of mixed_region_flag for top region 402 indicates that one or more first coding blocks (e.g., a first region) in top region 402 are intra-coded, and one or more second coding blocks (e.g., a second region) in top region 402 are inter-coded. In this example, top region 402 is partitioned into two regions, region 410, and region 420, which are both partitions at level 2, and at a depth of one from the top region 402. For example, top region 402 is partitioned in accordance with a predetermined partitioning scheme.

The intra_region_flag is present for region 420, indicating that all the coding blocks within region 420 are intra-coded. The region 420 further partitions into region 412 and region 414. The region 414, a level 3 partition at a depth of two from top region 402, is further partitioned into region 416 and region 418, which are partitions at level 4, and at a depth of three from top region 402. No intra_region_flags may be present for 412, 414, 416 and 418 because they are all partitions of region 420 and have been flagged at region 420 as being intra-coded. As such, the decoding component optionally will not perform any additional determination of intra_region_flags when parsing any partitions below region 420, including regions 412, 414, 416, and 418. Optionally, regions 412, 416, and 418 that are also leaf partitions may not include any other prediction mode indicators as they are intra-coded as indicated by the presence of intra_region_flags at region 420.

The mixed_region_flag is present for region 410, indicating that one or more first coding blocks (e.g., a first region) in region 410 are intra-coded, and one or more second coding blocks (e.g., a second region) in region 410 are inter-coded. The region 410 further partitions into region 422, region 424, and region 426, which are level 3 partitions. The inter_region_flag is present for region 422, indicating that all the coding blocks within region 422 are inter-coded, and the intra_region_flag is present for region 424, indicating that all the coding blocks within region 424 are intra-coded.

The inter_region_flag is present for region 426, indicating that all the coding blocks within region 422 are inter-coded. Further, region 426 is partitioned into two level 4 partitions of region 432 and region 434. No inter_region_flags may be present for 432 and 434 because they have both been flagged at region 426 as being inter-coded. In some embodiments, a flag is used to indicate that a region or block is coded in an intra-inter coding mode. An intra-inter coding mode refers to a coding mode that generates prediction block with both intra and inter predictions. For example, a prediction mode that derives the prediction block as a (e.g., weighted sum) of an intra prediction block and an inter prediction block.

The regions 422, 424, 432, 434, 412, 416, and 418 are leaf partitions. In some embodiments, the decoder does not determine whether any region type flags are present for leaf partitions and/or reads a leaf-level prediction mode indicator for the leaf partitions to determine their respective prediction mode. For example, a leaf partition under a region having a mixed_region_flag optionally does not include a region type flag but instead includes a prediction mode indicator for the decoder to determine the prediction mode of the leaf partition. In contrast, because regions 432, 434 are leaf partitions under an inter-coded region, region type flags and prediction mode indicators are optionally not signaled for these regions (e.g., all coding blocks in 432, 434 are inferred as inter-coded blocks). Similarly, because regions 416 and 418 are leaf partitions under an intra-coded region, region type flags and prediction mode indicators are optionally not signaled for these regions (e.g., all coding blocks in regions 432 and 434 are inferred as intra-coded blocks).

FIG. 4B illustrates an example partitioning pattern corresponding to the partition scheme described above with respect to FIG. 4A. For example, top region 402 is vertically split into two equal sized second level regions 410 and 420. The second level region 420 is further horizontally split into two equally sized third level regions 412 and 414. The region 414 is further horizontally split into two equally sized fourth level regions 416 and 418. The second level region 410 is further split into three third level regions 422, 424, and 426 (e.g., illustrated by partition 506 in FIG. 5). The region 426 is further horizontally split into two equally sized regions 432 and 434, that are level 4 partitions. In this example, the diagonal line shaded regions 420, 412, 414, 416, 418 and 424 are all intra-coded, whereas cross-hatched regions 422, 426, 432, and 434 are all inter-coded. In this example, the mixed_region_flag for the region 402 may be signaled, optionally with a predefined value to indicate that the region 402 includes both coding blocks that are intra-coded and coding blocks that are inter-coded. Similarly, intra_region_flag may be signaled for each of the regions 420, 412, 414, 416, 418, and 424 that are all intra-coded. For the region 420, intra_region_flag is signaled to indicate that all subsequent partitions are all intra coded. Consequently, no further lower level intra_region_flags are included for regions 412, 414, 416, 418, no matter whether they are leaf level partitions or not. This may help to reduce signaling overhead. Similarly, inter_region_flag may be used to indicate that regions 422, 426, 432 and 434 are all inter-coded. For top region 402, and region 410, mixed_region_flag may be used to indicate that some coding bocks are inter-coded while others are intra-coded.

Each coding block in coding regions depicted in FIG. 4A may be a luma coding block (also referred to as a "luma block") or a chroma coding block (also referred to as a "chroma block"). In some embodiments, a first partitioning type is applied to a luma block while a second partitioning type, different from the first partitioning type, is applied to a corresponding chroma block (e.g., a collocated chroma block).

Figure 5:
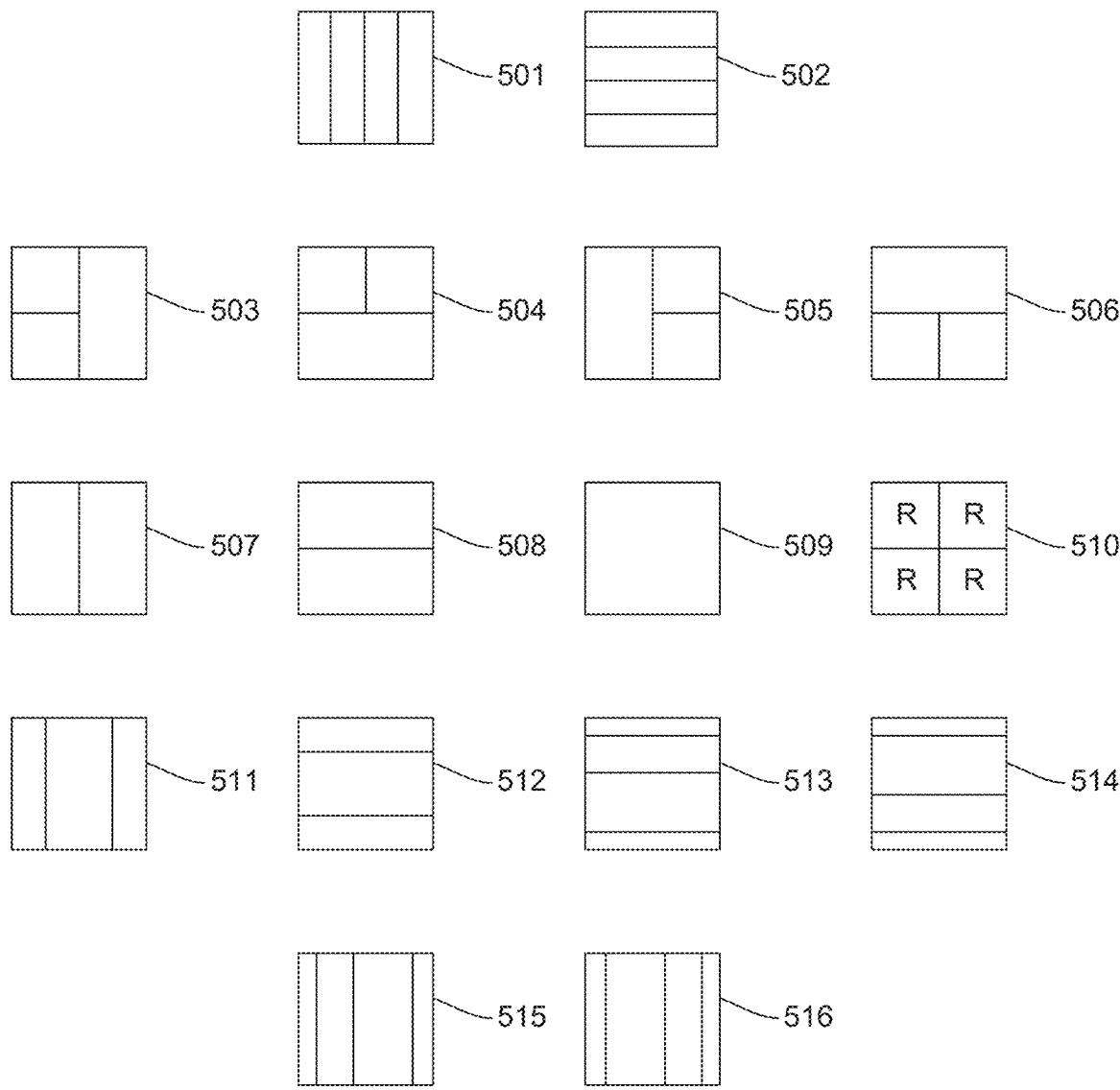
FIG. 5 illustrates different types of coding block partitioning in accordance with some embodiments.

FIG. 5 shows various partition types and partitioning structures in accordance with some embodiments. The partition types and/or structures illustrated in FIG. 5 may be used with the regions and flags described previously with respect to FIGS. 4A and 4B. An example predefined 10-way partitioning structure allows recursive partitioning to form a partitioning tree. The root block may start at a predefined level (e.g., from a base block at 128×128 or 64×64 level). Partitions 501, 502, 503, 504, 505, 506, 507, 508, 509, and 510 shown in FIG. 5 include various 2:1/1:2 and 4:1/1:4 rectangular partitions. The partition type may also include partitions from a ternary partitioning scheme that may be implemented vertically, as shown in partition 511, or horizontally, as shown in partition 512. While the example split ratio in FIG. 5 is shown as 1:2:1 for partitions 511 and 512, other ratios may be used. FIG. 5 also shows partition types that include partitions from an uneven 4-way split/partitioning scheme that may be implemented horizontally, as shown in partitions 513 and 514, or vertically, as shown in partitions 515 and 516. Partition 513 is horizontally split into 1:2:4:1 regions. Partition 514 is horizontally split into 1:4:2:1 regions. Partition 515 is vertically split with 1:2:4:1 regions. Partition 516 is vertically split with 1:4:2:1 regions.

In some embodiments, when a parsed syntax element (e.g., a signaled prediction mode flag, and/or a signaled region flag) indicates that all coding blocks within a coding region are intra-coded, luma blocks within the intra region are allowed to be further partitioned, but chroma blocks within the intra region are restricted from further partitioning (e.g., partition modes for the chroma blocks are restricted). For example, when chroma blocks are restricted from further splitting, the only partitioning available to the chroma blocks is the unitary partition 509 shown in FIG. 5. Thus, the partitioning illustrated in FIG. 4B for region 402 may refer to the partitioning of luma blocks of region 402 and a corresponding partitioning for the chroma blocks is shown in partitioning 450c of FIG. 4C. No further partitioning of the chroma blocks is allowed in the chroma block of region 420 (420c) because the region 420 is an intra region. In some embodiments, a high-level syntax is signaled into the bitstream (and received at the decoder) to indicate whether the chroma blocks within the intra region (optionally within an inter frame) is to be further split. Thus, instead of always restricting the partitioning of chroma blocks, the high-level syntax provides an option for enabling splitting of chroma blocks.

In some embodiments, luma blocks within the intra region can be further partitioned, while the corresponding chroma blocks share the luma block partitioning to a first depth, and partitioning of the chroma blocks are thereafter restricted (e.g., not allowed to be further partitioned). For example, the partitioning illustrated in region 402 of FIG. 4B may refer to the partitioning of luma blocks in the coding region and a corresponding partitioning for the chroma blocks is shown in partitioning 452c of FIG. 4D. For example, the chroma block may be allowed to share the luma blocking partitioning up to a depth of level 3 partitions but no further partitioning of the chroma blocks are allowed beyond that. In partitioning 452c, the chroma blocks in region 420 are split into region 412c and 414c, but no splits are allowed for the chroma blocks corresponding to luma blocks in regions 416, 418, 432 and 434. For example, chroma blocks may have less texture compared to chroma blocks, so chroma blocks do not need to be partitioned to the same depth as luma blocks.

In some embodiments, both luma blocks and chroma blocks within the intra region are further partitioned, but only a restricted subset of partition types is allowed for chroma blocks to be further split. In some embodiments, only a limit set of partitioning modes is allowed for chroma blocks (e.g., horizontal (e.g., partition 508) or vertical binary split (e.g., partition 507), or quadtree split (e.g., partition 510)) for chroma blocks within the intra region (optionally partitioned from an inter frame). For example, an uneven 4-way split (e.g., producing partitions 513, 514, 515, and 516 shown in FIG. 5) or a ternary split (e.g., producing partitions 511 and 512 shown in FIG. 5) are not allowed for the chroma blocks, but are allowed for luma blocks.

In some embodiments, if a block width is greater than a block height (e.g., regions 416 and 418) in an intra region, then only a vertical split (e.g., partition 507 in FIG. 5) is allowed for chroma blocks in that intra region (optionally partitioned from an inter frame). In some embodiments, if the block height is greater than the block width in an intra region, then only a horizontal split (e.g., partition 508 in FIG. 5) is allowed for chroma blocks in the intra region. In some embodiments, if the block width is equal to the block height (e.g., regions 732 and 734) in an intra region, only horizontal (e.g., partition 508) or vertical binary split (e.g., partition 507), or quadtree split (e.g., partition 510)) are allowed for chroma blocks within the intra region. In some embodiments, the allowed subset of partition types for the chroma blocks depends on the luma partition modes. For example, if a luma block is partitioned using a quadtree split (e.g., partition 510), then only a horizontal split (e.g., partition 508) is allowed for the corresponding chroma block; whereas if the luma block is partitioned using a ternary split (e.g., partitions 511 and 512), then only a vertical split (e.g., partition 507) is allowed for the corresponding chroma block. For example, when luma blocks and chroma blocks have different partition types, flags for signaling the respective partition mode have to be signaled. To reduce overhead, only a subset of partition modes is allowed for the chroma blocks to provide some flexibility for partitioning the chroma blocks.

In some embodiments, when a coding region is split into multiple child regions, if the block width or the block height of one child region is equal to or smaller than a threshold (e.g., a length threshold, or an area threshold), then the syntax indicating whether all coding blocks within a coding region is encoding using a pre-defined prediction mode is not parsed but derived as a default value. For example, the size threshold may be a sample size length of 4, and optionally the default value of the pre-defined prediction mode is a mixture of the intra prediction mode and the inter prediction mode. For example, if a 32×32 block is partitioned into four regions having sizes 4×32, 8×32, 16×32 and 4×32, respectively, due to the first and last regions having a width (or height) of 4, the syntax indicating whether all coding blocks within the coding region is the pre-defined prediction mode is not parsed but derived as a default value (e.g., a mixture of the intra prediction mode and the inter prediction mode). trying to derive if it's intra, inter or mixture). For example, a coding region is below a certain size threshold before all the coding blocks in the region are either all intra-coded or all inter-coded. For example, because the coding region is small, the overhead saved from not signaling the prediction mode may also be small.

In some embodiments when a coding region is split into multiple child regions, if the block width, the block height, the product of block width and height, the maximum of block width and block height, or the minimum of block width and block height of one child region is equal to or larger than a threshold (e.g., a length threshold, or an area threshold), then the syntax indicating whether all the sub-blocks within the first block is the pre-defined prediction mode is not parsed but derived as a default value. For example, the default value of the pre-defined prediction mode is a mixture of the intra prediction mode and the inter prediction mode. For example, the threshold is greater than or equal to 32. In some embodiments, when a coding region is too large (e.g., greater than the threshold), the prediction mode is not signaled but is inferred to be mixed coded, and is permitted to be partitioned into smaller regions that may then be signaled. When the coding region is too small, the prediction mode is also not signaled, but is inferred to be mixed coded but the coding region is not permitted to be further partitioned.

In some embodiments, whether a current block is within an intra region provides a context for a probability model that is used to encode the flag indicating a block partitioning type of the current block. The partition type includes any of the example partitions shown in FIG. 5. For example, the probability for a particular block partitioning type depends on whether the coding region is an inter region or an intra region, taking the region flag into account may improve the context used for entropy coding and also improve the efficiency of entropy coding.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream comprising a plurality of coding blocks. The system identifies (604), based on a first indicator (e.g., a first flag or syntax element) in the video bitstream, a coding region (e.g., as discussed above with reference to FIGS. 4A-4D) that comprises two or more luma blocks and two or more chroma blocks of the plurality of coding blocks, where at least a subset of luma blocks in the coding region is encoded in a first prediction mode and where each chroma block in the coding region is encoded in a second prediction mode, different than the first prediction mode. The system applies (606) a first partitioning to the two or more luma blocks in the coding region. The system applies (608) a second partitioning for the two or more chroma blocks in the coding region, where the second partitioning is different from the first partitioning. The system reconstructs (610) the coding region using the first partitioning and the second partitioning. In some embodiments, the coding region comprises one or more luma coding blocks and/or one or more chroma coding blocks.

In some embodiments, when a first block is split (partitioned) (e.g., recursively, or using a pre-defined splitting pattern) into one or more equal (or non-equal) size or smaller size sub-blocks, at least one flag is received at a decoder side to indicate whether all the sub-blocks under this partition point (or within this region) are coded with a first pre-defined prediction mode or not for at least one color (e.g., luma or chroma) component. The first pre-defined prediction mode can be an intra coding mode, and/or an inter coding mode, and/or a mixture of intra and inter coding modes. In some embodiments, the luma and chroma components may have different block partitioning.

In some embodiments, both the luma and chroma blocks have their own flexibility to be further partitioned within the coding region. In some embodiments, the chroma region has a different block partitioning from the luma region only when the luma region is coded using a specific pre-defined prediction mode (e.g., inter only prediction, or intra only prediction).

In some embodiments, when the luma region is coded using a mixture of intra and inter prediction modes, the chroma blocks may share at least part of the block partitioning of the luma region.

In some embodiments, luma blocks within the coding region can be further partitioned into multiple blocks whereas chroma blocks within the coding region are not allowed to be further partitioned.

In some embodiments, all the luma blocks are coded with a first pre-defined mode within the coding region whereas all the chroma blocks are coded with a second pre-defined mode. In some embodiments, the first and second pre-defined modes are the same. In some embodiments, the first and second pre-defined modes are different. In some embodiments, a flag is signaled for chroma components to indicate whether it is the same with luma block or not. In some embodiments, if luma blocks within the coding region are coded with intra prediction mode, then chroma blocks are implicitly derived as intra coded blocks. In some embodiments, if luma blocks within the coding region are coded with inter prediction mode, then the prediction mode of chroma blocks can be different with luma blocks.

In some embodiments, a flag is signaled for chroma components to indicate whether it (the prediction mode) is the same with luma block or not. In some embodiments, when the flag is true, both luma and chroma blocks are coded as inter coded blocks. Otherwise, when the flag is false, luma blocks within the coding region are coded with inter prediction mode whereas chroma blocks are coded with cross-component intra prediction mode, such as chroma from luma intra prediction mode or implicit chroma from luma intra prediction mode.

In some embodiments, the chroma coding block may apply sub-block inter prediction mode, and the motion information for each chroma sub-block is derived by the motion information associated with the co-located luma sub-block. In some embodiments, the co-located position is defined by the top-left sample of the current chroma sub-block. In some embodiments, the co-located position is defined by the central sample of the current chroma sub-block.

In some embodiments, luma blocks within the coding region can be a mixture of intra and inter coded blocks, but all chroma blocks within the coding region are coded with a pre-defined mode, such as intra or inter prediction mode.

In some embodiments, chroma blocks within the coding region can be coded as a mixture of intra and inter coded blocks, but all luma blocks within this region are coded with a pre-defined mode, such as intra or inter prediction mode.

In some embodiments, chroma blocks within the coding region can be coded by a combination of intra and inter prediction modes. Examples of combined intra and inter prediction modes include a combination of cross-component intra prediction mode and inter prediction mode, whereas the inter prediction mode may be derived from the inter prediction mode associated with the co-located luma coding blocks.

In some embodiments, a high-level syntax is signaled into the bitstream to indicate whether luma and chroma blocks can use different prediction modes within a region, where luma and chroma can have different block partitioning within the region.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system. In some embodiments, the method 650 is performed by a same system as the method 600 described above.

The system receives (652) video data (e.g., a source video sequence) comprising a plurality of blocks. The system identifies (654) a coding region that comprises two or more luma blocks and two or more chroma blocks of the plurality of blocks, where at least a subset of luma blocks in the coding region are to be encoded in a first prediction mode, and where each chroma block in the coding region is to be encoded in a second prediction mode, different than the first prediction mode. The system encodes (656) the two or more luma blocks and the two or more chroma blocks of the coding region into a video bitstream by applying a first partitioning for luma blocks in the coding region and applying a second partitioning for chroma blocks in the coding region, where the second partitioning is different from the first partitioning. As described previously, the encoding process may mirror the decoding processes described herein (e.g., partitioning procedures). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving a video bitstream (e.g., a coded video sequence) comprising a plurality of coding blocks; (ii) identifying, based on a first indicator (e.g., a flag or syntax element) in the video bitstream, a coding region that comprises one or more luma coding blocks and one or more chroma coding blocks of the plurality of coding blocks, where at least a subset of luma coding blocks in the coding region is encoded in a first prediction mode and where each chroma coding block in the coding region is encoded in a second prediction mode, different than the first prediction mode; (iii) applying a first partitioning to the one or more luma blocks in the coding region; (iv) applying a second partitioning for the one or more chroma blocks in the coding region, where the second partitioning is different from the first partitioning; and (v) reconstructing the coding region using the first partitioning and the second partitioning. For example, when a first block is split into two or more smaller sub-blocks, a flag may be received at a decoder side to indicate whether all the sub-blocks under this partition point (or within this region) are coded with a first predefined prediction mode (e.g., for at least one color component). The first predefined prediction mode may be an intra coding mode, an inter coding mode, or a mixture of intra and inter coding mode. Luma and chroma components may have different block partitioning. For example, both luma and chroma blocks have their own flexibility to be further partitioned within the region. In some embodiments, the first prediction mode comprises an inter prediction mode. In some embodiments, the second prediction mode comprises an intra prediction mode. In some embodiments, the coding region consists of two or more luma coding blocks and two or more chroma coding blocks.

(A2) In some embodiments of A1, the at least a subset of luma coding blocks in the coding region comprises all luma coding blocks in the coding region. For example, each luma coding block in the coding region is encoded in the first prediction mode.

(A3) In some embodiments of A1, a second subset of luma coding blocks in the coding region is encoded in a third prediction mode, different than the first prediction mode. For example, luma blocks within the region can be a mixture of intra and inter coded blocks, but all chroma blocks within the region are coded with a predefined mode, such as intra or inter prediction mode. In some embodiments, chroma blocks within the region are coded as a mixture of intra and inter coded blocks, but all luma blocks within the region are coded with a predefined mode, such as intra or inter prediction mode. In some embodiments, the third prediction mode is the same as the second prediction mode.

(A4) In some embodiments of any of A1-A3, applying the first partitioning and the second partitioning is performed when (in accordance with a determination that) each luma coding block in the coding region is encoded in the first prediction mode. The method further comprises, when (in accordance with a determination that) each luma coding block in the coding region is not encoded in the first prediction mode, applying a same partitioning to the two or more luma blocks in the coding region and to the two or more chroma blocks in the coding region. For example, only when luma region is coded using specific predefined prediction modes (e.g., inter only prediction, or intra only prediction) can the chroma region have different block partitioning with luma.

(A5) In some embodiments of any of A1-A4, applying the second partitioning to the two or more chroma blocks in the coding region comprises applying a same partitioning to the two or more chroma blocks and the two or more luma blocks to a first depth, and applying a different partitioning to the two or more chroma blocks and the two or more luma blocks beyond the first depth.

(A6) In some embodiments of A5, applying the different partitioning to the two or more chroma blocks and the two or more luma blocks beyond the first depth comprises forgoing further partitioning of the two or more chroma blocks. For example, luma blocks within the region can be further partitioned into multiple blocks whereas chroma blocks are not allowed to be further partitioned. As another example, when the luma region is coded using a mixture of intra and inter prediction modes, chroma may share at least partial of the block partitioning of luma region.

(A7) In some embodiments of any of A1-A6, the method further comprises identifying, based on a second indicator in the video bitstream, that each chroma coding block in the coding region is encoded in the second prediction mode. For example, a flag is signaled for chroma component to indicate whether the chroma component uses a same prediction mode as the luma component. In some embodiments, the chroma component and the luma component have a same prediction mode (e.g., both are inter predicted, intra predicted, or inter-intra predicted). In some embodiments in which the chroma component and the luma component have the same prediction mode, the first partitioning is applied to the two or more luma blocks and the second partitioning is applied to the one or more chroma blocks.

(A8) In some embodiments of any of A1-A7, the method further comprises determining that each chroma coding block in the coding region is encoded in the second prediction mode based on each luma coding block in the coding region being encoded in the first prediction mode. For example, if the luma blocks within the region are coded with inter prediction mode, then chroma blocks are implicitly derived as intra coded blocks. In some embodiments, if the luma blocks within this region are coded with intra prediction mode, then chroma blocks are implicitly derived as intra coded blocks. In some embodiments, if the luma blocks within the region are coded with inter prediction mode, then the prediction mode of chroma blocks may be different than the prediction mode of the luma blocks.

(A9) In some embodiments of A8, when (in accordance with a determination that) each luma coding block in the coding region is encoded in the first prediction mode, a third indicator is signaled in the video bitstream, the third indicator indicating whether each chroma coding block in the coding region is encoded in the second prediction mode. For example, a flag is signaled for the chroma component to indicate whether the prediction mode is the same as with luma component.

(A10) In some embodiments of A9, when (in accordance with a determination that) the fourth indicator has a first value, each luma coding block in the coding region has a same prediction mode as each chroma coding block in the coding region. When (in accordance with a determination that) the fourth indicator has a second value, two or more chroma coding blocks of the plurality of coding blocks are encoded with a cross-component prediction mode. For example, when the flag is true, both luma and chroma blocks are coded as inter coded blocks. When this flag is false, luma blocks within this region are coded with inter prediction mode and chroma blocks are coded with cross-component intra prediction mode, such as chroma-from-luma (CfL) intra prediction mode or implicit chroma-from-luma intra prediction mode.

(A11) In some embodiments of any of A1-A10, the second prediction mode comprises a sub-block inter prediction mode. For example, the chroma coding block may apply sub-block inter prediction mode, and the motion information for each chroma sub-block may be derived by the motion information associated with the co-located luma sub-block.

(A12) In some embodiments of any of A1-A11, a fifth indicator is signaled in the video bitstream. The fifth indicator indicates whether the two or more luma blocks and the two or more chroma blocks are required to have a same prediction mode. In some embodiments, the fifth indicator is signaled in a high-level syntax. For example, a high-level syntax is signaled into the bitstream to indicate whether luma and chroma blocks can use different prediction modes within one region, where the luma and chroma can have different block partitioning within this region.

(A13) In some embodiments of any of A1-A12, a sixth indicator is signaled in the video bitstream, the sixth indicator indicating whether the two or more luma blocks and the two or more chroma blocks are required to have a same partitioning. In some embodiments, the sixth indicator is signaled in a high-level syntax.

(B1) In another aspect, some embodiments include a method (e.g., the method 650) of video encoding. In some embodiments, the method is performed at a computing system (e.g., the server system 112) having memory and one or more processors. In some embodiments, the method is performed at a coding module (e.g., the coding module 320). The method includes: (i) receiving video data (e.g., a source video sequence) comprising a plurality of blocks (e.g., corresponding to one or more pictures); (ii) identifying a coding region that comprises two or more luma blocks and two or more chroma blocks of the plurality of blocks, where at least a subset of luma blocks in the coding region are to be encoded in a first prediction mode, and where each chroma block in the coding region to be encoded in a second prediction mode, different than the first prediction mode; and (iii) encoding the two or more luma blocks and the two or more chroma blocks of the coding region into a video bitstream by applying a first partitioning for luma blocks in the coding region and applying a second partitioning for chroma blocks in the coding region, where the second partitioning is different from the first partitioning.

(B2) In some embodiments of B1, the at least a subset of luma coding blocks in the coding region comprises all luma coding blocks in the coding region.

(B3) In some embodiments of B1 or B2, a second subset of luma coding blocks in the coding region to be encoded in a third prediction mode, different than the first prediction mode.

(B4) In some embodiments of any of B1-B3, applying the second partitioning to the two or more chroma blocks in the coding region comprises applying a same partitioning to the two or more chroma blocks and the two or more luma blocks to a first depth, and applying a different partitioning to the two or more chroma blocks and the two or more luma blocks beyond the first depth.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) obtaining a source video sequence that comprises a plurality of frames; and (ii) performing a conversion between the source video sequence and a video bitstream of visual media data according to a format rule. The video bitstream comprises: (a) a plurality of encoded blocks corresponding to the plurality of frames, and (b) an indicator indicating a coding region of a frame of the plurality of frames. The coding region comprises two or more luma coding blocks and two or more chroma coding blocks of the plurality of coding blocks. At least a subset of luma coding blocks in the coding region is encoded in a first prediction mode and each chroma coding block in the coding region is encoded in a second prediction mode, different than the first prediction mode. The format rule specifies that: (c) the two or more luma blocks are partitioned according to a first partitioning, and (d) the two or more chroma blocks are partitioned according to a second partitioning that is different from the first partitioning.

(C2) In some embodiments of C1, the at least a subset of luma coding blocks in the coding region comprises all luma coding blocks in the coding region.

(D1) In another aspect, some embodiments include a method of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream comprising a plurality of coding blocks; (ii) identifying, based on a first indicator in the video bitstream, a coding region that comprises two or more luma blocks and two or more chroma blocks of the plurality of coding blocks, where each luma block in the coding region is encoded in a first prediction mode and where at least a subset of chroma blocks in the coding region is encoded in a second prediction mode, different than the first prediction mode; (iii) applying a first partitioning to the two or more luma blocks in the coding region; (iv) applying a second partitioning for the two or more chroma blocks in the coding region, where the second partitioning is different from the first partitioning; and (v) reconstructing the coding region using the first partitioning and the second partitioning. For example, chroma blocks within this region can be coded as a mixture of intra and inter coded blocks, but all luma blocks within this region are coded with a pre-defined mode, such as intra or inter prediction mode.

(D2) In some embodiments of D1, a first subset of the two or more chroma blocks are coded in an intra prediction mode and a second subset of the two or more chroma blocks are coded in an inter prediction mode. For example, chroma blocks within the region can be coded by a combination of intra and inter prediction modes. Examples of combined intra and inter prediction modes, include but not limited to combination of cross-component intra prediction mode and inter prediction mode, whereas the inter prediction mode may be derived from the inter prediction mode associated with the co-located luma coding blocks.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A13, B1-B4, C1-C2, and D1-D2 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A13, B1-B4, C1-C2, and D1-D2 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream comprising a plurality of coding blocks;

identifying, based on a first indicator in the video bitstream, a coding region that comprises two or more luma blocks and two or more chroma blocks of the plurality of coding blocks, wherein at least a subset of luma coding blocks in the coding region is encoded in a first prediction mode and wherein each chroma coding block in the coding region is encoded in a second prediction mode, different than the first prediction mode;

applying a first partitioning to the two or more luma blocks in the coding region;

applying a second partitioning for the two or more chroma blocks in the coding region, wherein the second partitioning is different from the first partitioning; and reconstructing the coding region using the first partitioning and the second partitioning.

2. The method of claim 1, wherein the at least a subset of luma blocks in the coding region comprises all luma blocks in the coding region.

3. The method of claim 1, wherein a second subset of luma blocks in the coding region is encoded in a third prediction mode, different than the first prediction mode.

4. The method of claim 1, wherein applying the first partitioning and the second partitioning is performed when each luma block in the coding region is encoded in the first prediction mode; and the method further comprises, when each luma block in the coding region is not encoded in the first prediction mode, applying a same partitioning to the two or more luma blocks in the coding region and to the two or more chroma blocks in the coding region.

5. The method of claim 1, wherein applying the second partitioning to the two or more chroma blocks in the coding region comprises applying a same partitioning to the two or more chroma blocks and the two or more luma blocks to a first depth, and applying a different partitioning to the two or more chroma blocks and the two or more luma blocks beyond the first depth.

6. The method of claim 5, wherein applying the different partitioning to the two or more chroma blocks and the two or more luma blocks beyond the first depth comprises forgoing further partitioning of the two or more chroma blocks.

7. The method of claim 1, further comprising, identifying, based on a second indicator in the video bitstream, that each chroma block in the coding region is encoded in the second prediction mode.

8. The method of claim 1, further comprising determining that each chroma block in the coding region is encoded in the second prediction mode based on each luma block in the coding region being encoded in the first prediction mode.

9. The method of claim 8, wherein, when each luma block in the coding region is encoded in the first prediction mode, a second indicator is signaled in the video bitstream, the second indicator indicating whether each chroma block in the coding region is encoded in the second prediction mode.

10. The method of claim 9, wherein:

when the second indicator has a first value, each luma block in the coding region has a same prediction mode as each chroma block in the coding region; and when the second indicator has a second value, two or more chroma blocks of the plurality of coding blocks are encoded with a cross-component prediction mode.

11. The method of claim 1, wherein the second prediction mode comprises a sub-block inter prediction mode.

12. The method of claim 1, wherein a second indicator is signaled in the video bitstream, the second indicator indicating whether the two or more luma blocks and the two or more chroma blocks are required to have a same prediction mode.

13. The method of claim 1, wherein a second indicator is signaled in the video bitstream, the second indicator indicating whether the two or more luma blocks and the two or more chroma blocks are required to have a same partitioning.

14. The method of claim 1, wherein the first partitioning and the second partitioning have at least one of: one or more different partitioning types, different partitioning directions, and different partitioning depths.

15. A computing system, comprising:

control circuitry;

memory; and one or more sets of instructions stored in the memory and configured for execution by the control circuitry, the one or more sets of instructions comprising instructions for:

receiving video data comprising a plurality of blocks;

identifying a coding region that comprises two or more luma blocks and two or more chroma blocks of the plurality of blocks, wherein at least a subset of luma blocks in the coding region are to be encoded in a first prediction mode, and wherein each chroma block in the coding region is to be encoded in a second prediction mode, different than the first prediction mode; and encoding the two or more luma blocks and the two or more chroma blocks of the coding region into a video bitstream by applying a first partitioning for luma blocks in the coding region and applying a second partitioning for chroma blocks in the coding region, wherein the second partitioning is different from the first partitioning.

16. The computing system of claim 15, wherein the at least a subset of luma blocks in the coding region comprises all luma blocks in the coding region.

17. The computing system of claim 15, wherein a second subset of luma blocks in the coding region to be encoded in a third prediction mode, different than the first prediction mode.

18. The computing system of claim 15, wherein applying the second partitioning to the two or more chroma blocks in the coding region comprises applying a same partitioning to the two or more chroma blocks and the two or more luma blocks to a first depth, and applying a different partitioning to the two or more chroma blocks and the two or more luma blocks beyond the first depth.

19. A non-transitory computer-readable storage medium storing one or more sets of instructions configured for execution by a computing device having control circuitry and memory, the one or more sets of instructions comprising instructions for:

obtaining a source video sequence that comprises a plurality of frames; and performing a conversion between the source video sequence and a video bitstream of visual media data according to a format rule, wherein the video bitstream comprises:

a plurality of encoded blocks corresponding to the plurality of frames, and an indicator indicating a coding region of a frame of the plurality of frames, wherein the coding region comprises two or more luma blocks and two or more chroma blocks of the plurality of coding blocks, wherein at least a subset of luma blocks in the coding region is encoded in a first prediction mode and wherein each chroma block in the coding region is encoded in a second prediction mode, different than the first prediction mode, wherein the format rule specifies that:
  the two or more luma blocks are partitioned according to a first partitioning, and
  the two or more chroma blocks are partitioned according to a second partitioning that is different from the first partitioning.

20. The non-transitory computer-readable storage medium of claim 19, wherein the at least a subset of luma coding blocks in the coding region comprises all luma coding blocks in the coding region.

* * * * *